United States Patent [19]

Fontan

[11] 4,282,705

[45] Aug. 11, 1981

[54] GRAPE PICKING MACHINE

[76] Inventor: Andre Fontan, 11 rue Republique, 32110 Nogaro, France

[21] Appl. No.: 948,547

[22] Filed: Oct. 4, 1978

[30] Foreign Application Priority Data

Oct. 10, 1977 [FR] France ............................. 77 30639

[51] Int. Cl.³ ............................................ A01D 46/00
[52] U.S. Cl. ........................................ 56/330; 56/16.5
[58] Field of Search ............... 56/330, 328, 130, 16.6, 56/16.5

[56] References Cited

U.S. PATENT DOCUMENTS

| | | | |
|---|---|---|---|
| 3,420,045 | 1/1969 | Holzmann | 56/330 |
| 3,727,388 | 4/1973 | Smith | 56/330 |
| 3,827,222 | 8/1974 | Toti | 56/330 |
| 3,890,775 | 6/1975 | Bruel | 56/330 |
| 4,022,001 | 5/1977 | Burton | 56/330 |
| 4,150,526 | 4/1979 | Burton | 56/330 |

FOREIGN PATENT DOCUMENTS

| | | | |
|---|---|---|---|
| 1495369 | 8/1967 | France | 56/330 |
| 2193541 | 2/1974 | France | 56/330 |
| 2258783 | 8/1975 | France | 56/330 |
| 2277526 | 2/1976 | France | 56/330 |
| 2303464 | 10/1976 | France | 56/330 |
| 2310078 | 12/1976 | France | 56/330 |
| 517866 | 2/1940 | United Kingdom | 56/330 |

*Primary Examiner*—Jay N. Eskovitz
*Attorney, Agent, or Firm*—Sandler & Greenblum

[57] ABSTRACT

A grape picking machine is disclosed which includes a device for detaching a grape harvest, a sealing device positioned at the level of grapevine trunks for recovering the grape harvest and preventing it from falling from the machine, and at least one device for evacuating the grape harvest from the machine. The machine includes a chassis carrying structure for driving each of the devices, the structure including towing apparatus raised at three points of a tractor having support blocks and a portico laterally positioned on the chassis. The portico has a front element inclined rearwardly with respect to the vertical axis of the chassis and beating means are positioned on the front element for removing the grape harvest. The sealing device comprises non-aligned rows of scales.

37 Claims, 16 Drawing Figures

GRAPE PICKING MACHINE

BACKGROUND OF THE INVENTION

The present invention generally relates to grape pickers and more specifically to a grape picking machine which can detach a grape harvest, seal the harvest and then evacuate the harvest from the machine.

Conventional grape pickers comprise essentially at least one whip or needles beater type device for detaching grape clusters, a sealing device at the level of the grapevine trunks adapted for recovering grapes and at least one evacuation device. In most of these machines, the various devices are carried by a large cross-over type chassis which treats at least one row of vines. The chassis includes transportation means which can be either self-propelled or drawn. Most of these devices are quite expensive. Self-propelled machines require a significant capital investment for several months, and the drawn machine requires the use of strong tractors which are not generally accessible. Further, driving these machines is difficult, particularly at the end of a row, due to the dimensions of the machines, which in turn causes a large area to remain uncultivated. This, in turn, leads to reduced profits.

SUMMARY OF THE INVENTION

One object of the present invention is to overcome these inconveniences by providing a less expensive grape picker which can be widely used, is of simple design, easy to repair and maintain, maneuverable and light, and useable in conjunction with generally available average powered tractors.

A further object of the present invention is to provide a grape picker which can detach a maximum of vine clusters and which recovers and conveys a grape harvest at minimum cost, as much in grapes as in must, and with a minimum of impurities and wastes (e.g., leaves and vine shoots).

In accordance with the above objects, the grape picker provided by the present invention is of the type comprising devices for detaching a grape harvest, sealing devices at the level of the grapevine trunks for recovering the detached grape harvest, and devices for evacuating the grape harvest further comprised by a chassis carrying driving elements, the chassis including towing means attached to three points of a tractor, support blocks which may be slidable upon the ground, and a laterally positioned portico having a front element rearwardly inclined with respect to the vertical axis of the chassis and upon or at the level of which beater devices, recovery or sealing devices, and at least one evacuation device is disposed. This arrangement, in which the portico and harvesting elements are offset with respect to the chassis, provides a compact machine less cumbersome than those of the prior art. This permits the user of the tractor to oversee the operation of the harvesting elements. Further, the machine could be pulled by the tractor or slid upon the ground on support blocks. Additionally, it may be inclined by lifting in order to vary the height of the machine as desired. By adjusting the height of the machine, it can be supported near the ground to obtain a better seating and a low height, so that the grape harvesting elements will be located at a level sufficiently low to harvest the vine clusters below the trunk of the clusters. The height is modifiable by adjustment of the chassis with respect to the support blocks.

In accordance with another embodiment of the invention, the devices for detaching the harvest include two groups of beaters or inclined shafts which are arranged on both sides of an inclined portion of the portico and which are oriented toward the median axis of the portico. The groups of beaters are activated in reciprocal motion by a diagonal rod which cooperates with an angled lever fixed to the center at a level higher than the portico for moving two wooden carrier shaft boards. This eliminates or minimizes vibrations in the machinery as well as the necessity for having complex arrangements to move the boards.

In accordance with another embodiment of the invention, each beater group includes alternately long and short shafts angularly offset and disposed in two planes which provide a double beating plane on each side of the inclined portico. These planes are arranged diagonally with respect to the vine row, according to the inclination of the portico and/or the inclination of the chassis as regulated by the tractor lift. This avoids the simultaneous beating of shafts upon the vertical vine protectors, minimizes shaking of the vine plant and results in progressive beating.

According to still another characteristic of the present invention, the sealing device comprises two parallel rows of overlapping opposite scales. The rows are superimposed like shingles, and each scale has a substantially triangular form and is attached at its summit to one of the parallel spars located on both sides of the portico. The scales have convex end bases or sides in order to form in each row a rim of moveable sawteeth which surround each grapevine trunk as the machine is being advanced to prevent the grape harvest from falling out of the machine onto the floor. The point of each scale approaches from the rear of the grapevine trunk base and cooperates with a scale or scales of the parallel row to surround each trunk.

According to another embodiment of the device formed in accordance with the present invention, a ventilator is provided which sucks up both wastes and the portion of must which is transported by the conveyor device and which has not gone into the bucket. Thereafter, a stopping and evacuation device is provided for the wastes and it separates the must from the wastes. The air which receives the must being purified is then blown to the level of the scale row positioned farthest from the lateral conveyor. This serves to propel the grape harvest towards the conveyor and prevents it from falling between the scales while it recycles the must. The air is preferably pulsed along two superimposed planes at the level of the scales by a double nozzle. The nozzle includes an upper outlet tube blowing on the upper row of scales (as the scales are arranged in two rows shingled rows) and a lower outlet tube blowing air under the first row of scales at the level of the second row or at the space between the two rows. Such action improves the sealing capability of the device and prevents the grape harvest and associated wastes from embedding themselves between scales.

The waste stoppage device is preferably a substantially horizontal circular grill which is off-centered with respect to an aspiration hood and to the conveyor upon which it rotates. The stoppage device includes a cleaning brush arranged thereon.

BRIEF DESCRIPTION OF THE DRAWINGS

Other advantages and characteristics of the present invention will appear to the reader from the following description of one embodiment of the invention given by way of non-limited examples and illustrated by the attached drawings, in which.

PREFERRED EMBODIMENTS OF THE INVENTION

Figure 1:
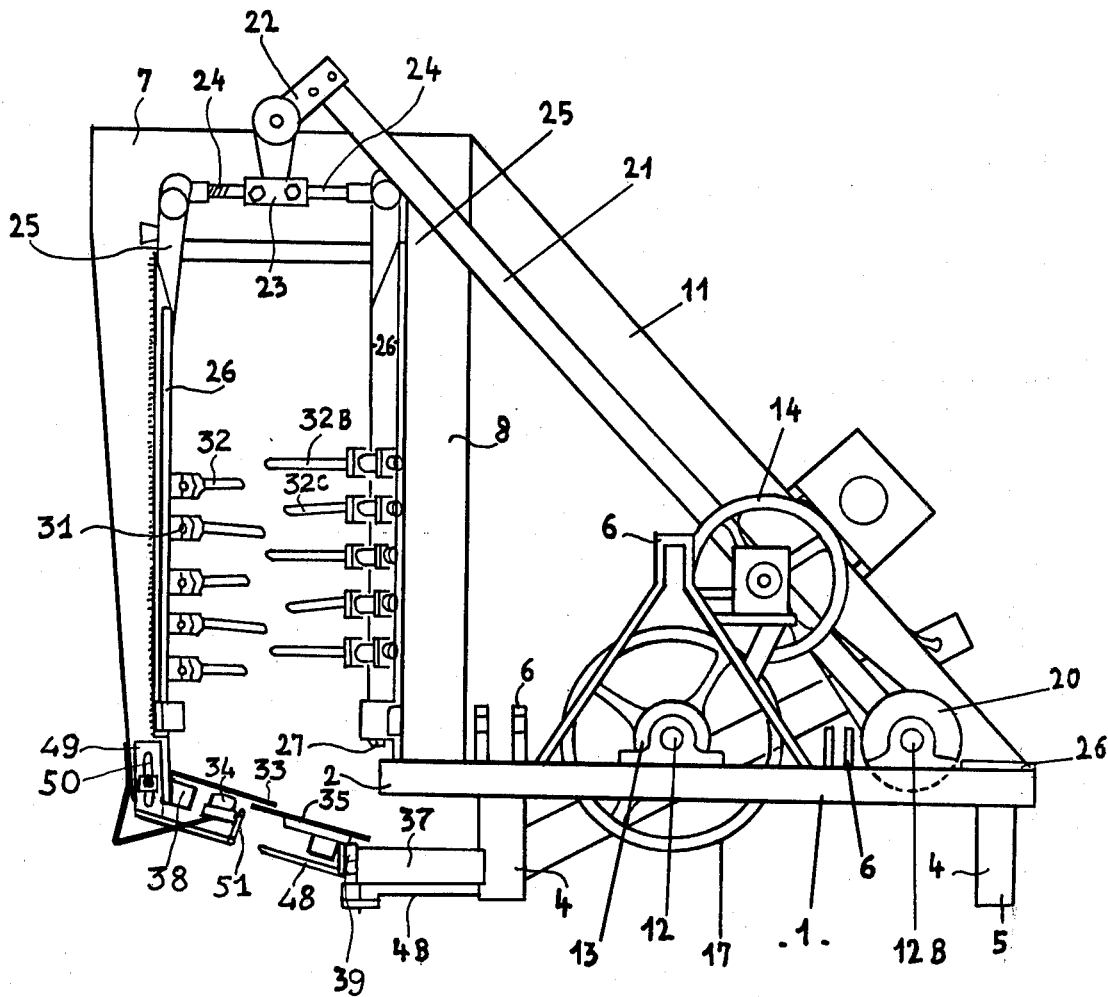
FIG. 1 is a front elevational view of the machine made in accordance with the present invention.

As shown, the machine made in accordance with the present invention comprises a chassis 1 of square shape having spars 2 and 2B connected by crossbeams 3 and 3B. The chassis is supported on the ground by two pairs of legs 4 which are connected by a longitudinal support block 5. Preferably, legs 4 on one side of the machine which carry the support block 5 under spar 2B are moveably mounted on grooves (not shown) in crossbeams 3 and 3B upon which they can be held by a pin, block or other similar device in order to make possible, when desired, an increase in the path of the machine.

Figure 2:
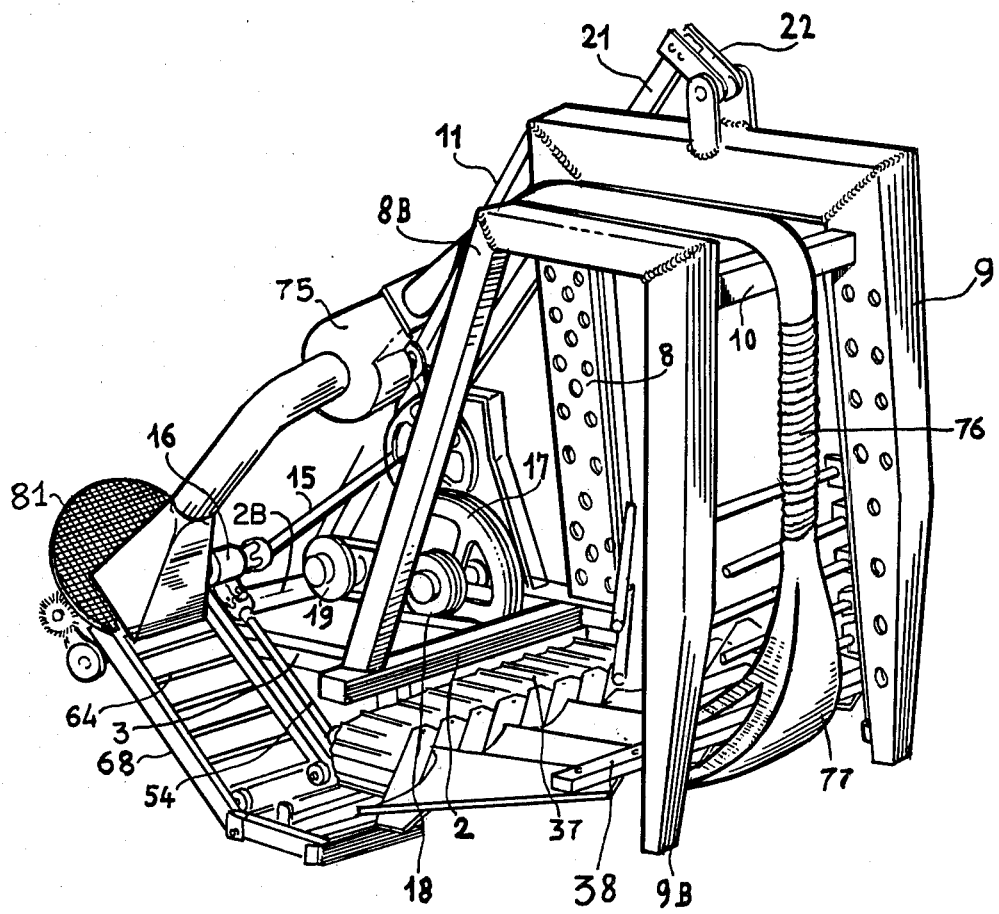
FIG. 2 is a substantially rear perspective view of the machine of FIG. 1.
Figure 9:
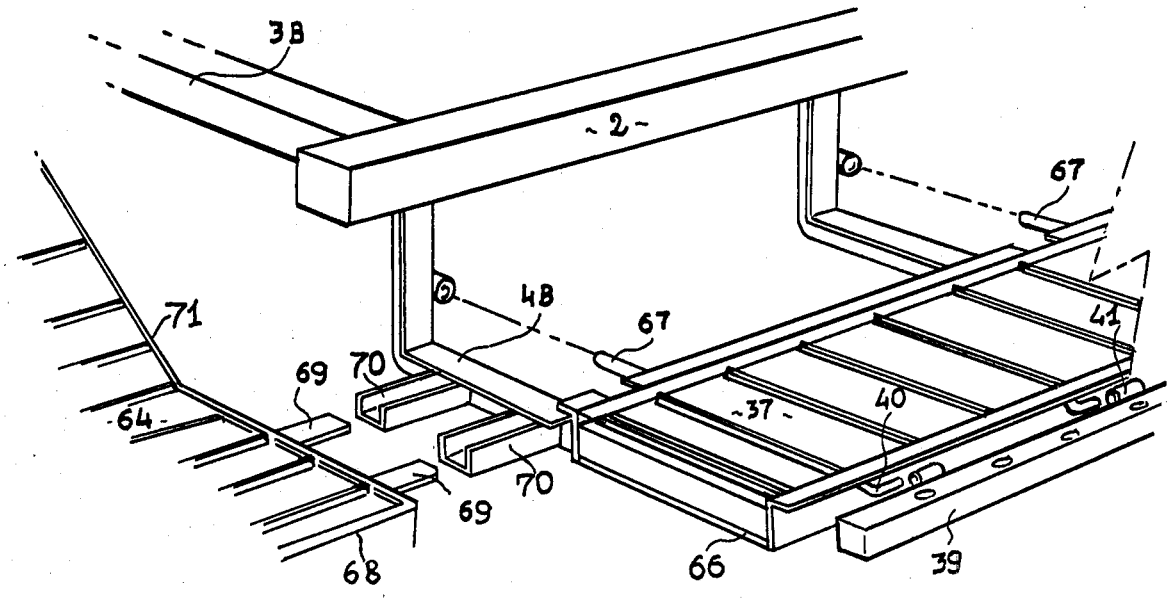
FIG. 9 is a partial perspective view of the conveyors and conveyor fastening devices forming part of the machine of the present invention.

The legs are extensible via grooves to regulate their height. The legs 4 located on the other side of the machine from the preceding legs are integral with spar 2 and have a vertical section and a horizontal section 4B forming a crib support for one of the grape harvest evacuation devices, as illustrated in FIG. 9. Chassis 1 is provided on its front crossbeam 3 with known towing means 6 raised at three points of a tractor. A portico 7 having two elements 7 and 7B is attached to the chassis laterally to spar 2 and the extremity of crossbeam 3 by uprights 8 and 8B so that it will be displaced with respect to the tractor. Vertical uprights 9 and 9B are connected to uprights 8 and 8B by a crossbeam and are maintained freely at a specified distance above the ground, e.g., 0.50 meters. Portico elements 7 and 7B are arranged in a substantially parallel plane to form a tunnel and are connected by crossbeams 10, as illustrated in FIG. 2. Preferably, front element 7 of the portico is rearwardly inclined and is supported by crossbeams 10 on portico element 7B. An inclined strut 11 connects portico element 7 to spar 2B. The driving elements of portico-carry beating and sealing devices and evacuation devices are mounted on chassis 1. The driving elements comprise a universal shaft power drive of a known type (not shown) which is coupled with the shaft of the tractor power drive. This power drive rotates a horizontal shaft 12 mounted in a bracket on front crossbeam 3 and in an end bracket on an intermediate crossbeam parallel to crossbeam 3. The shaft 12 carries a small diameter grooved pulley 13, which in turn activates a relatively large diameter pulley 14 carried by a unit having a front drive attached on a right-angle elbow integral with triangle 6. The relatively large diameter pulley 14 drives each of the grape harvest evacuation devices as described hereinafter by a universal joint transmission 15 with differential 16. On the shaft 12 between its two levels a relatively large diameter pulley 17 is mounted which is adapted to activate the aspiration turbine attached to inclined strut 11.

At the end of shaft 12, a grooved pulley 18, as seen in FIG. 2, is set which has moveable cheek plates which in turn drive via a belt, a pulley 19 which similarly has moveable cheek plates fixed at the end of horizontal shaft 12B. Shaft 12B is parallel to shaft 12 and is rotatable at the levels of crossbeams 3. The pulleys have moveable cheek plates and form a variable gear. An eccentric is fixed on shaft 12B which activates, in alternating movement, a rod 21 which is slanted towards the top of element 7 where the rod cooperates with an elbow lever 22. The lever is attached by a bracket at the level of its angle on a horizontal shaft integrally attached to the front beam of portico element 7 by two braces. The end of the angled lever is provided with socket 23 formed by two transverse parallel sideplates. Two opposite horizontal arms 24 on both sides of the elbow lever are pivotably mounted between the sideplates on a bracket with a bearing element. Each arm 24 is integral with a socket and pivots from one inclined spar 25 welded on a metallic board 26, each board carrying beater elements. Each board is welded on a shaft 27 parallel to uprights 8 and 9 and corresponding to the portico on which the board is free to oscillate in an upper and lower bracket. The boards are not parallel to uprights 8 and 9 but are inclined towards the longitudinal median axis of these uprights at an angle which is approximately 35 degrees. The boards are activated by a reciprocating movement transmitted to them at their upper extremities occurring as a result of activation of the angled lever by slanted rod 21. A single lever thereby transmits movement to the two groups of beaters and its attachment to the summit of the beater carrying members dampens the vibrations in vertical uprights 8 and 9. This permits elimination of the mechanical transmissions normally required to be attached on both sides of the vertical uprights to move the board shaft carriers at their middle portion by various combinations of gears, chains, and pinions.

Figure 3:
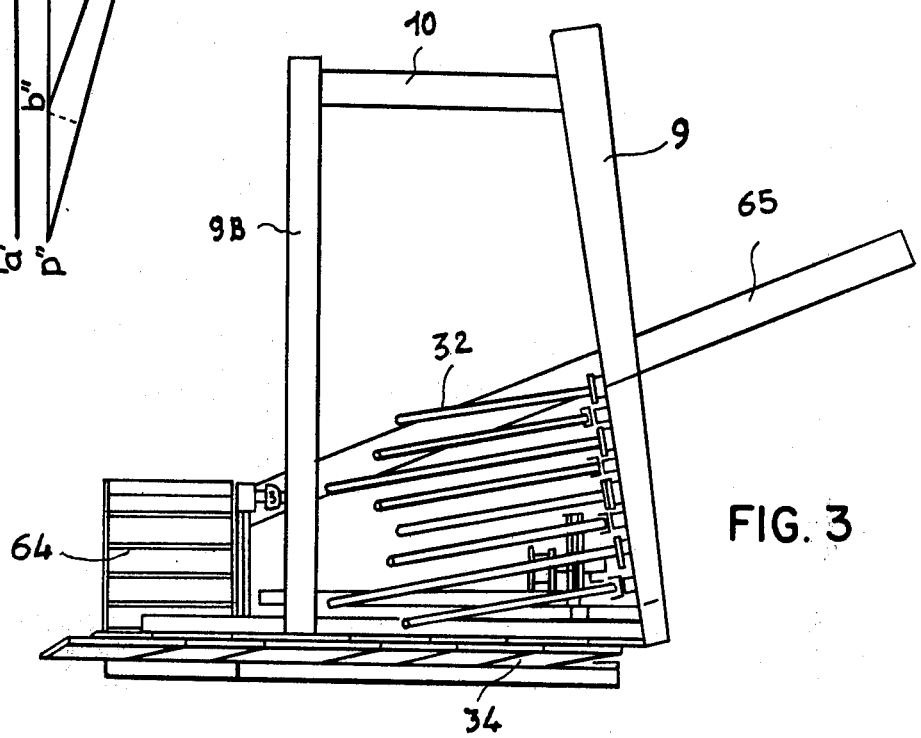
FIG. 3 is a side elevational view of the machine of FIG. 1.
Figure 10:
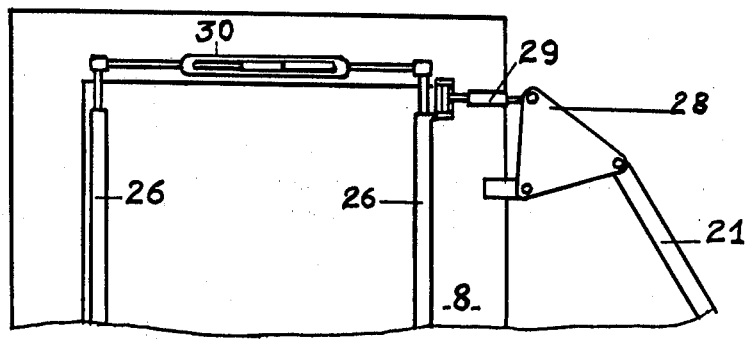
FIG. 10 is a partial elevational view of the displaced level driving device forming part of the machine of the present invention.

In accordance with another embodiment of the present invention, as shown in FIG. 10, a lever or sprocket 28 attached at three points in triangular orientation is attached to a horizontal brace provided on upright 8 of front portico 7. Lever 28 has the general shape of an isosceles triangle arranged horizontally along its height. The lever is attached onto upright 8 at one of its base angles and its other base angle is connected to spar 25 of first board 26. A small bracket 30 having a space adjustment connecting link connects spars 25 of boards 26 so that movement of one spar in one direction causes the other spar to move in the opposite direction. Small bracket 29 is attached to the summit angle of triangular lever 28 to impart an oscillating movement to the lever about its axis of attachment to upright 8. This embodiment of the device, in which lever 28 is displaced towards the center of gravity of the machine, increases the stability of the machine, reduces vibrations and permits the formation of a shorter machine. Two parallel rows of perforations are laterally provided on each board 26 and are regularly spaced for attaching a plurality of beaters to shoe means 31 comprised of two-half shells. This arrangement permits variation of the position of the beaters by their attachment to different perforations. Each board, therefore, carries a group of beaters. Each of the beater groups comprises rigid or semi-rigid shafts 32 which can be of fiberglass, e.g., five regularly spaced shafts. These shafts are mounted in shoe means 31, each of which is formed of two half shells arranged perpendicularly to one of the boards such that the shafts will be inclined and non-horizontal with respect to the board. Accordingly, the shafts will be offset with respect to the grapevine supports, so that some shafts will leave the supports when other shafts reach them, as is seen in FIG. 3, thereby avoiding simultaneous hitting and shaking of the vine supports by all of the beaters. Preferably, long shafts 32B and short shafts 32C alternate in each group of beaters to increase the potential beating surface of the vine trunks and thereby achieve double beating with a single board. The beater groups attached to each board are offset in height with respect to each other, as seen in FIG. 1.

Figure 4:
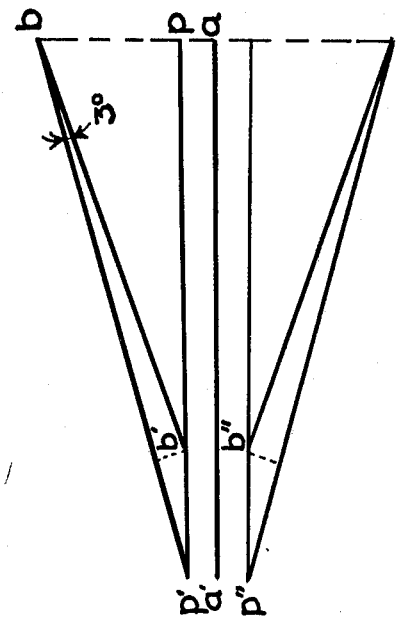
FIG. 4 is a bottom schematic view of the double beating plane occupied by the beaters of the machine of FIG. 1.

In accordance with another embodiment of the present invention, shafts of the same group are offset angularly by about 3 degrees with respect to each other, a shaft which is positioned parallel to the plane of the board being followed by a shaft inclined secant with respect to the plane and inclined towards the center of the tunnel so that they comprise a double beating plane B' and B'', as seen in FIG. 4, and P' and P''. This arrangement substantially increases the beating efficiency of the machine. This arrangement of shafts parallel to the support and secant to its plane is reversed from one beater group to the other to essentially obtain a greater threshing efficiency. The angularly offset arrangement can be obtained either by introducing a wedge under the half shell of the attachment shoe of one shaft or by removing material from the half shell.

Sealing device 33 is arranged on the threshing device. One alternative movement of the threshing device is communicated by rod 21, as described hereinabove, for detaching clusters or grapes, dependent upon the maturity of the vine. The function of sealing device 33 is to enclose the grapevine trunks and to receive each vine while sliding it towards the evacuation device. The sealing device comprises two rows 34 and 35 of scales 36 arranged as shingles, one above the other, as illustrated in FIGS. 1 and 2. The rows are inclined in the same direction, towards the lateral parallel conveyor 37, the upper row partially covering the lower row. A spar 38 joins portico uprights 9 and 9B, the spar being pierced by a succession of annular orifices to form a bracket in which the attachment axes of scales 35 are introduced by pinning and are arranged under the spar. The spar is preferably carried by two end spindles which cooperate with the brackets of uprights 9 and 9B to comprise a support axis for the scales. The inclination of the spar is accordingly adjustable. Scales 36 mutually overlap in the manner of shingles and are inclined towards conveyor 37. A spar 39 parallel to spar 38 is arranged laterally with respect to conveyor 37 and is similarly perforated with orifices for the same purpose. Spar 39 receives a succession of inclined scales 35 from underneath which overlap as shingles which are oriented in a direction opposite to the direction of orientation of the upper row 34 under which they are situated. Spar 39 is attached to conveyor 37 by a double hinge comprising horizontal hinge pins 40 integral with the conveyor and eyes 41 attached to the spar by cottering. This arrangement permits inclination and facilitates the assembly and disassembly of the machine.

Figure 6:
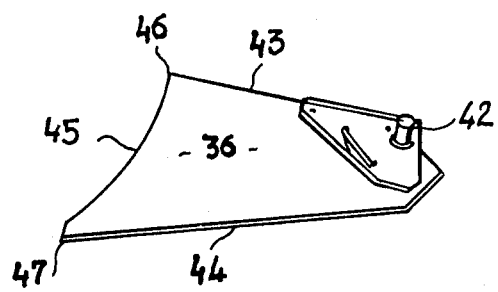
FIG. 6 is a perspective view of a scale used in the machine of the present invention.
Figure 5:
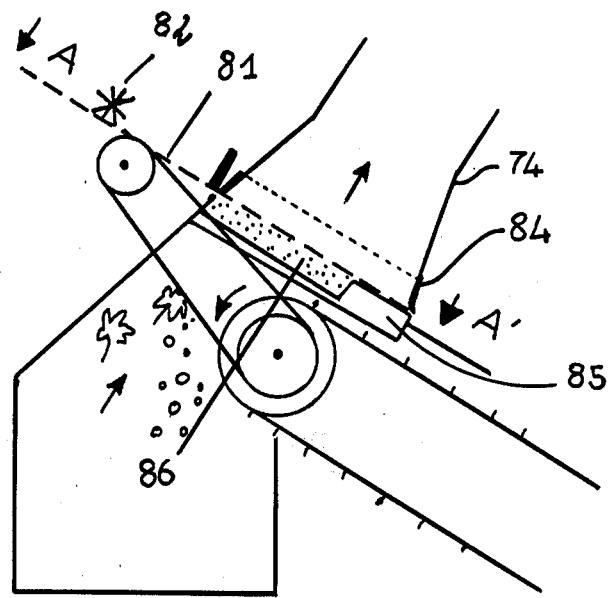
FIG. 5 is an elevational view of the waste evacuation device which forms part of the machine of the present invention.
Figure 5:
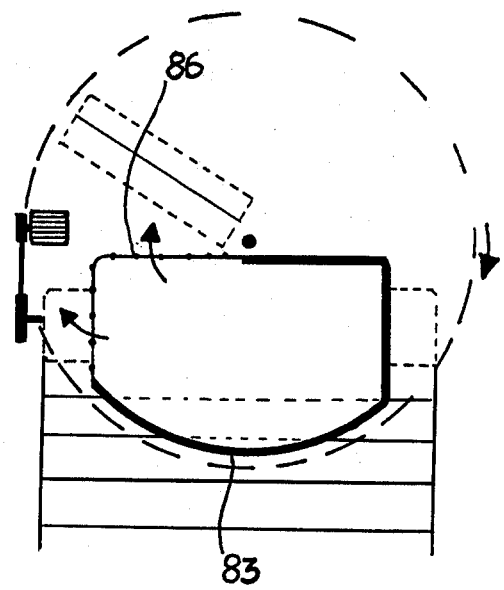
Figure 7:
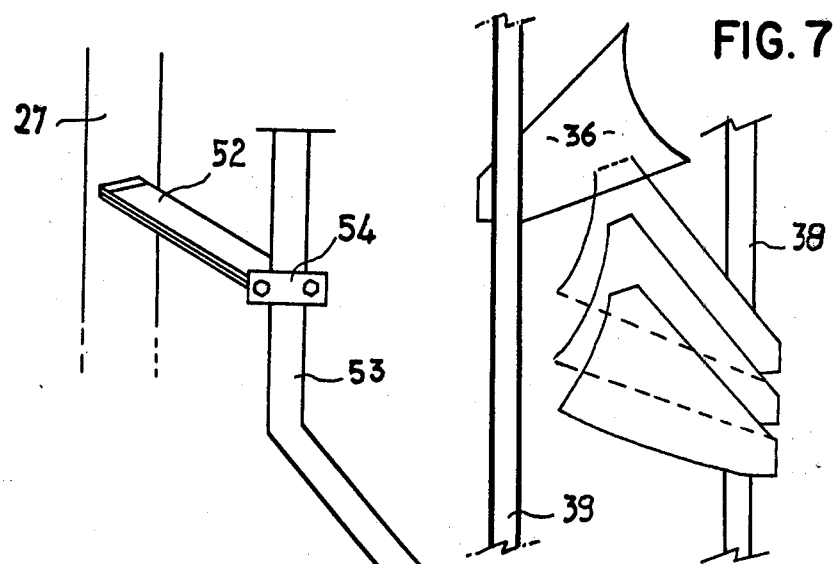
FIG. 7 is a partial plan view of a sealing device forming part of the machine of the present invention.

According to another particular characteristic of the invention, scales 36 are comprised of a substantially triangular leaf of synthetic material with a mount 42 for carrying the attachment and rotation shafts. The scales have a return spring (not shown) which cooperates with the spar. They also have a relatively small side 43 connected to a relatively large side 44, as illustrated in FIG. 6, the large side having a length greater than half of the width of the tunnel formed by the portico elements and arranged so that its greater length edge is secant to the small side edge via a terminal side or base in the shape of an arc 45 of a circle. The arc is inclined towards the small side such that a tooth 46 and a point 47 are formed on each scale. The length of the small side is preferably less than approximately a quarter of the large side. When the scales of row 35 are arranged on spar 39 integrally with the conveyor, the small side 43 of each scale is substantially perpendicular to the spar and comprises the portion of the scale which attacks the grapevine trunk. The large sides of the scales are inclined. The scales 36 of row 34 attached to spar 38 integrally with portico uprights 9 and 9B are inclined so that the small attack side 43 of each scale is secant with respect to the attack side of the scales in lower row 35 and the edge is in the shape of an arc of a circle oriented in a direction opposite and secant to that of the scales facing the lower row. As illustrated, the scales of each row, when stationary, overlap over approximately one-third to two-thirds of their surface so that the sides of the rows adjacent to the tunnel define a succession of sawteeth in which each point is moveable. The scales of upper row 34 overlap those of the lower row such that the tunnel defined by the portico is blocked at its base. As the machine penetrates into a vineyard, the vine trunks push the scales rearwardly and the scales are positioned about the base of the vine trunks without creating empty spaces between the trunk and the scales through which a grape harvest could fall to the ground. During penetration of the first trunk which is encountered by the advancing machine into the tunnel, the base of the trunk comes into contact with the scales of both the lower row and the upper row substantially at the same level as the point of intersection of sides 43. The scales pivot backwardly about their respective axes so that the base of the trunk is received by both the sawtooth formed by the first and second scales of the upper row and the sawtooth formed by the scales of the lower row, this movement repeating itself all along the rows of scales. The arrangement of scales is such that at least three scales cooperate in blocking the area around one trunk base, e.g., two lower scales and one upper scale. Because the small sides of the scales are arranged in the arc of a circle, the points and teeth of the scales of each row extend beyond or to the level of the axis formed by a succession of bases, either behind or in front of each of the bases. This arrangement assures an efficient blocking and prevents undesirable loss of a grape harvest. Furthermore, due to the convex configuration of the small side or base of each scale, the passage of the point of each scale behind the base or bases of the vine occurs progressively and without coupling and is in relation to the position of the trunk with respect to the axis formed by the row of trunks or bases. Under each row of scales a rail 48 is mounted substantially parallel to the median axis of the row and the front and rear ends of the rail are bent towards the scale supports. The rails guide the bases of the vine into the tunnel axis and limit the inclination of the scales.

Rail 48 which is arranged under the upper row 34 of scales is attached to the extremities of uprights 9 and 9B. For this reason, each of the rail ends is provided with a vertical bracket 49 having a vertical slot 50 cooperating with a bolt of the corresponding upright to adjust the rail height. Preferably, a disc 51 is attached above the rail and parallel to it underneath the scales. The rail 48 which is mounted under lower row 35 of scales is bolt-mounted on the shaft support of the row. In order to increase the efficiency of the scales at their blocking level and the efficiency of movement of the grape harvest by gravity towards the lateral conveyor, the scales are provided with a device for adjusting inclination and initiating vibration.

Figure 8:
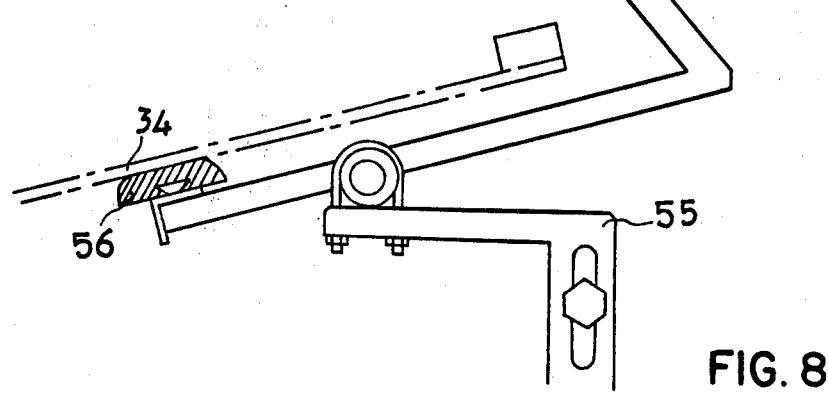
FIG. 8 is a view of the scale vibration device forming part of the machine of the present invention.
Figure 11:
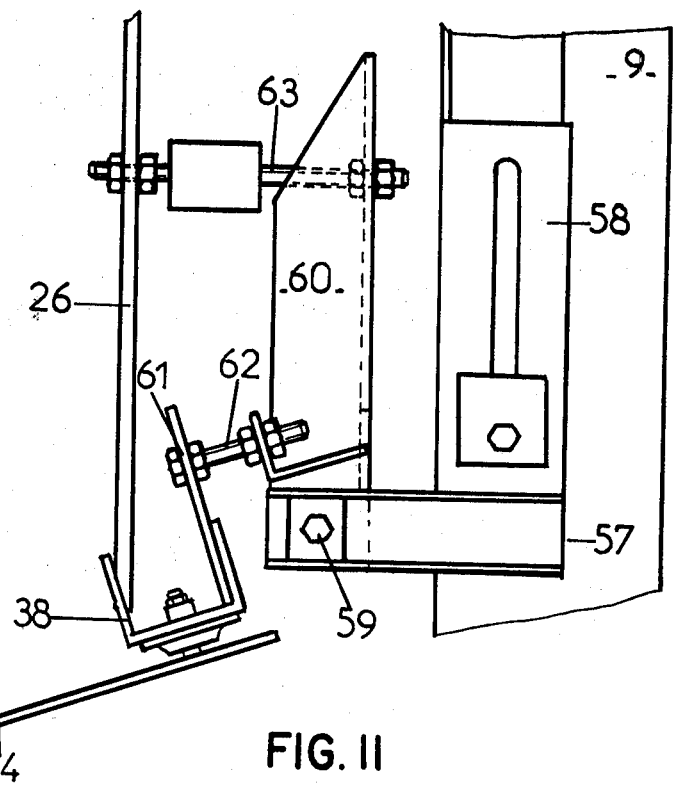
FIG. 11 is a partial elevational view of the scale vibration device and scale fastening elements forming part of the machine of the present invention.
Figure 12:
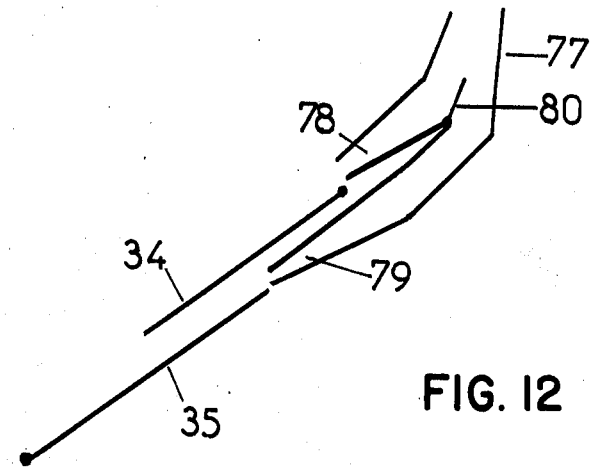
FIG. 12 is a schematic view of the blowing nozzle forming part of the machine of the present invention.

This device, as illustrated in FIG. 8, comprises a small bracket 52 welded on beater group attachment shaft 27 which is integral with portico upright 9 so that the small bracket can be substantially horizontally reciprocated. A vertically reciprocating right-angled brace 53 cooperates at one of its extremities with bracket 52 via a grooved bridle 54 mounted on a flexible bushing. The brace is attached at the level of the lower vine branch which comes under the upper row of scales. Brace 53 is attached with a flexible bushing to a height adjustable right-angled support 55 on upright 9. The extremity of the brace, which carries a wearing plate 56 (e.g., of wood) supported under all of the scales, alternately moves from a high to a low position which serves to vibrate the scales and accelerate the movement of the grape harvest towards scale row 35 and lateral conveyor 37. Alternately, the extremity of the right-angled brace can move rotatably, which translates into a rising movement and which raises the scales by a wearing plate transverse to the extremity. The vibrator device as described and illustrated in FIGS. 1 and 8 vibrates the scales in a desirable manner. However, the wearing plate 56 supported under the scales of row 34 tends to retard the return of the scales to place after the parts of the vine have passed. For this reason the embodiment of the device shown in FIG. 11 is preferred.

According to this embodiment of the invention, the upper row of scales 34 is activated by a raising and lowering movement via a joint linkage attached to upright 9. Spar 38 supports the upper scale row and is joined at its end to a right-angled brace 57 on which a vertical upright 58 is height-adjustably mounted by a vertical slit cooperating with a bolt on each of the uprights 9 and 9B. The attachment of spar 38 and right-angled braces 57 is via flexible bushing 59. A small bracket 60 is attached to a shaft with flexible bushing 59 parallel to portico upright 9 and to the corresponding moveable beater-carrying plate. By this arrangement the bracket can be rotatably moved around the axis of flexible bushing 59. The small bracket 60 is connected to an angle iron 61 on scale supporting spar 38.

Preferably, the connection between right angle 61 and small bracket 60 is effected by a bolt 62 with adjustable nuts and locknuts for desirably adjusting the angle formed by bracket 60 and the upper row of scales. Bracket 60 is provided with a vertical adjustment slot in which a connection shaft 63 is mounted and bolted upon both bracket 60 and moveable board 26; the board carrying beater elements and having a succession of orifices. Preferably, a flexible bushing vibration deadener is interposed on shaft 63 between bracket 60 and moveable board 26. The alternating movements of the board will thereby be transmitted to spar 38 and to the group of scales which it supports.

The amplitude of vibrational movement from the top to the bottom of the scales which is obtained is adjusted by moving shaft 63 towards attachment 59. This preferred mode of vibrating the scales, however, can be replaced by other suitable devices.

Figure 13:
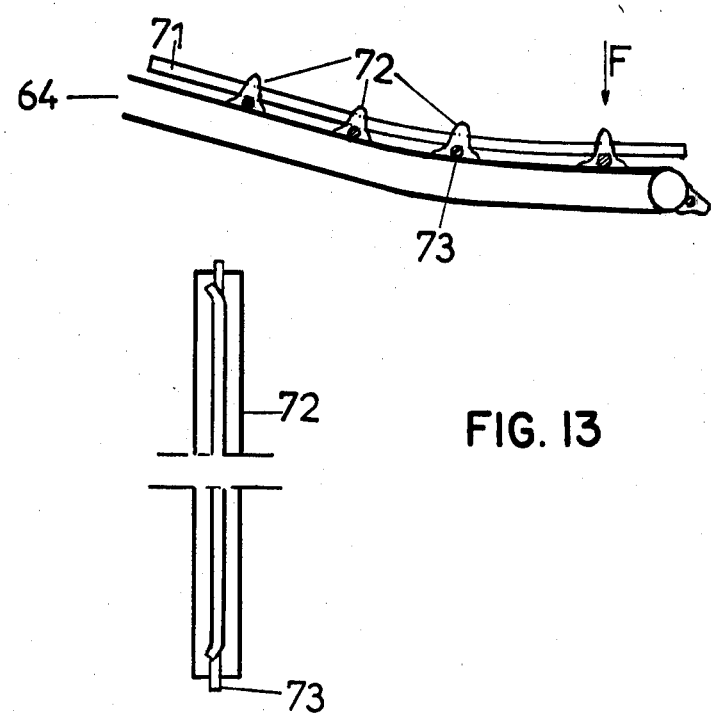
FIG. 13 is a partial side elevational view of one of the conveyors and its brackets of the present invention.

The device for evacuating the grape harvest comprises a conveyor 37 horizontally and laterally positioned with respect to the scales. The conveyor is bordered by the lower row 35 of scales and is met at one end by a perpendicular conveyor 64 transverse to the chassis having an ascending portion under which is arranged the end of a conveyor 65 ascending with a feeding channel. The ascending conveyor places the grape harvest either into a bucket pulled laterally with and by the machine in a parallel vine row or in a bucket carried laterally upon the tractor as described hereinbelow. The ascending conveyor is orientatable in order to move in the direction of the bucket which is used. Conveyor 37 comprises a carpet having ribs or holes and provided with a tensioning device. This conveyor is arranged in case 66 resting on the crib on the right angle having a base formed by the legs 4B of the chassis, as illustrated in FIG. 9. Two pegs 67 are inserted into orifices of legs 4 where they are pinned to simplify assembly and disassembly of the conveyor and the machine. The conveyor carpet is activated by a cardan type transmission 54 coupled to differential unit 16. Return conveyor 64 is perpendicular to conveyor 37 and has a horizontal portion extending to the end of conveyor 37 at a lower level to facilitate evacuation of a grape harvest and an ascending, upwardly directed portion with return pulleys and a tensioning device. Conveyor 64 is a carpet having low or short transverse ribs adapted to receive must and it is arranged in a frame 68 in a fashion similar to the arrangement of conveyor 37 and frame 66. Frame 68 is attached on an upright behind the chassis by bolting or pinning and is positioned perpendicularly to the planar portion with one or two horizontal flaps 69 which fit into guide 70 on legs 4B of the chassis where they can be pinned. Conveyor 64 is activated by unit 16. Return conveyor 64 is provided with elements to maintain its carpet in position at the level of the transition between its horizontal portion and its ascending portion, as illustrated in FIGS. 9 and 13. These guiding elements soften the change of direction of the carpet and comprise two parallel guide rods 71 attached on both sides of the carpet on the sides of the frame between the horizontal portion and a point beyond the point of transition. The carpet of conveyor 64 is provided with transverse parallel ribs or cleats 72 which can comprise small, substantially triangular bars glued by vulcanization or other process onto the conveyor carpet. Each of the cleats is axially traversed by a rigid shaft 73 which may be metallic. Each shaft has a circular cross-section and ends which extend beyond both sides of the cleat to be fit under the guide rods. The conveyor carpet is tangent to each of the metallic shafts which prevents cutting of the carpet during its deformations caused by the change of direction of the carpet and its passage over the rollers. This arrangement assures the rigidity of the carpet while permitting upward curvature at the level of its direction change. Preferably, the two ends of the cleats are curved upwardly to comprise a gutter adapted to receive juice at the same time as grapes.

At the level of the summit of the transverse conveyor an aspirating hood 74 and a turbine 75 are arranged for separating the grape harvest from the vine leaves and wastes. A device for stopping wastes which directs wastes to the exterior of the machine, outside of the evacuation installation and the aspiration cell, is mounted under the hood. At the same time that the wastes are stopped, juice sucked into the hood is blown by conduit 76 and nozzle 77 to the level of the upper scales where the juice is recycled; the air being blown further serves to push the grape harvest and the juice towards conveyor 37. Preferably the nozzle, which is fixed on a crossbeam of uprights 9 and 9B, has two tube openings 78 and 79 superimposed and offset in the shape of a horizontal slit. One opening is at the level of the upper row of scales and the other comes under the upper row at the level of the lower row of scales so that the air is pulsed into the gap between the two rows to improve the seal and particularly to prevent the grape harvest and the wastes from entering the gap, which would be detrimental to the proper machine operation. A moveable shutter 80 maneuverable from the exterior is advantageously mounted in the nozzle prior to the separation of the tube into two openings or bypasses to enable quantitative adjustment of the air flow towards either of the openings.

Preferably, the waste stopping device comprises a discoidal grill 81 positioned substantially horizontal or inclined. The grill is situated between aspiration hood 74 and conveyor 64. The grill is off-centered with respect to the hood and the conveyor and is rotated by a pulley fixed to the end of a shaft of the conveyor which in turns activates a friction pulley on the grill. A cleaning brush is arranged on the grill to be freely rotatable or act as a grill driving element. During its rotation, the grill conducts waste outside of the aspiration zone, where the waste falls to the ground under gravity and/or under the action of the brush.

According to a preferred embodiment of the invention, a substantially rectangular shaped hood 74 has a sector 83 in the shape of an arc of a circle concentric to the rotation of grill 81.

The hood is provided with lips 84 which come into contact with the grill to laterally seal and assist the aspiration. Under grill 81, in opposite facing relation to the hood edges, a supple lip 85 is fixed to the housing of the recovery channel of the grape harvest evacuated by the lateral conveyor. Lip 85 contacts the grill to coact with lip 84 to form the seal. The lip 85 has a lateral slit 86 over the portion of the hood where the grill 81, by rotation, expels the wastes which are tightly pressed by the ascending current of air, as illustrated in FIG. 6. Lip 85 has an arc of a circle sector corresponding to the sector 83 of the hood such that wastes slide but are not blocked. This arrangement assures more efficient separation and evacuation of wastes. Driving the grill rotatably may equally be achieved by a transmission connected to one of the shafts belonging to the carpet. The grill could alternately comprise a large diameter pulley having a throat receiving a perforated wall and driven by a belt. This device, which permits separation of the grape harvest from the wastes, can equally comprise a hood and a device aspirating the wastes to the upper layer of the transverse conveyor with a nozzle positioned so that the blowing of air occurs at the level of the scales.

Figure 14:
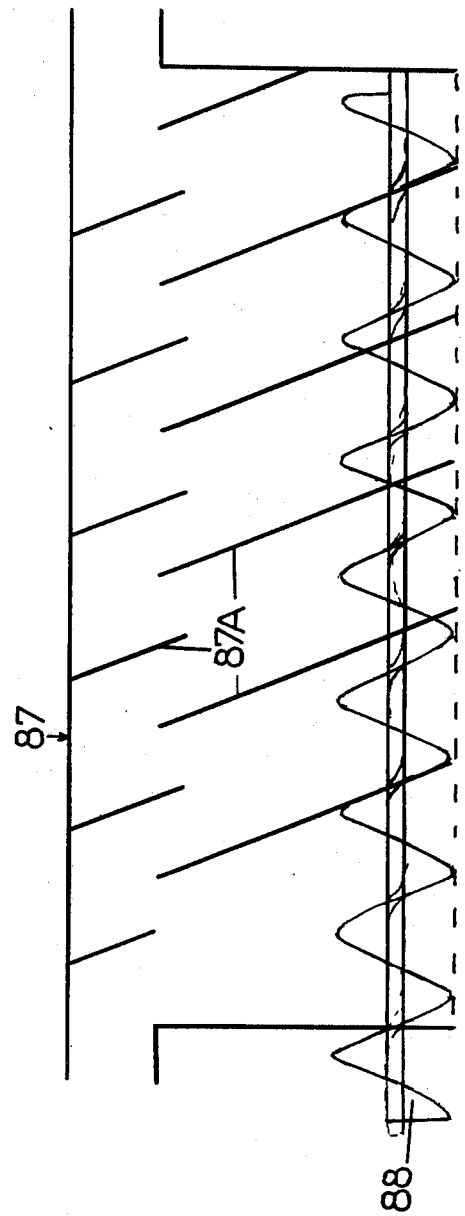
FIG. 14 is a elevational view of an impurities stopping device which can be used in conjunction with the machine of the present invention.

A container 87 is mounted on the conduit between the hood and the nozzle, the containing having an inlet, an outlet and a system of internal baffles 87A adapted to stop wastes and permit air to pass. The wastes fall under the influence of gravity to the bottom of the container, from which they can be evacuated, e.g., by means of a grape harvest trap or, as shown in FIG. 14, by an endless screw conveyor 88 opening to the exterior of the container and driven by a transmission connected to the driving members of the machine.

Figure 16:
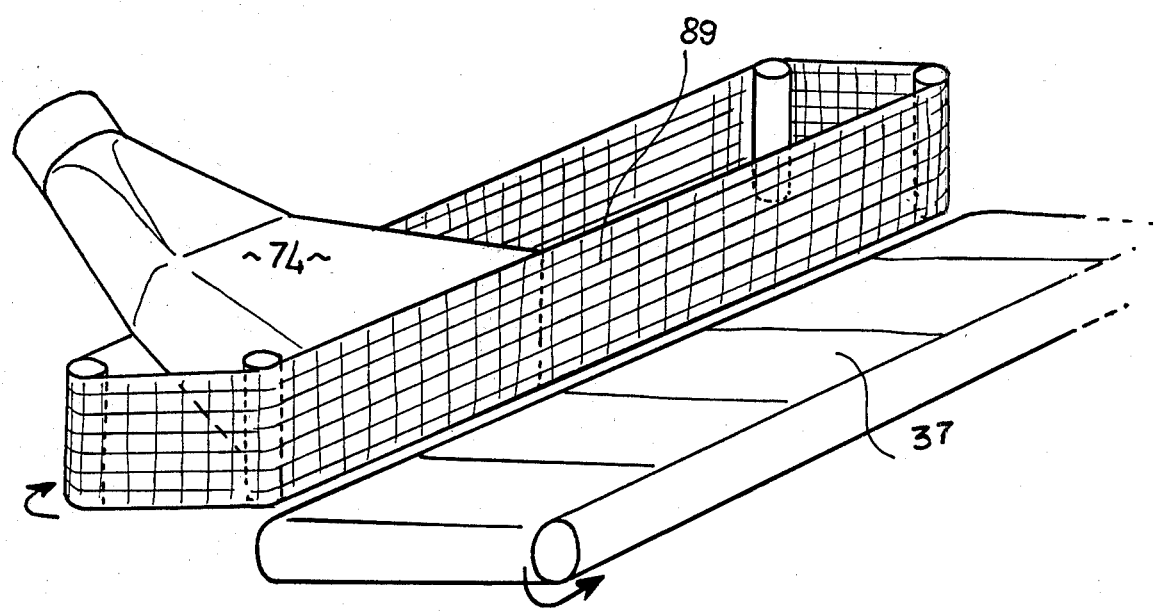
FIG. 16 is a perspective view of an alternate embodiment of the waste evacuation device used with the machine of the present invention.
Figure 15:
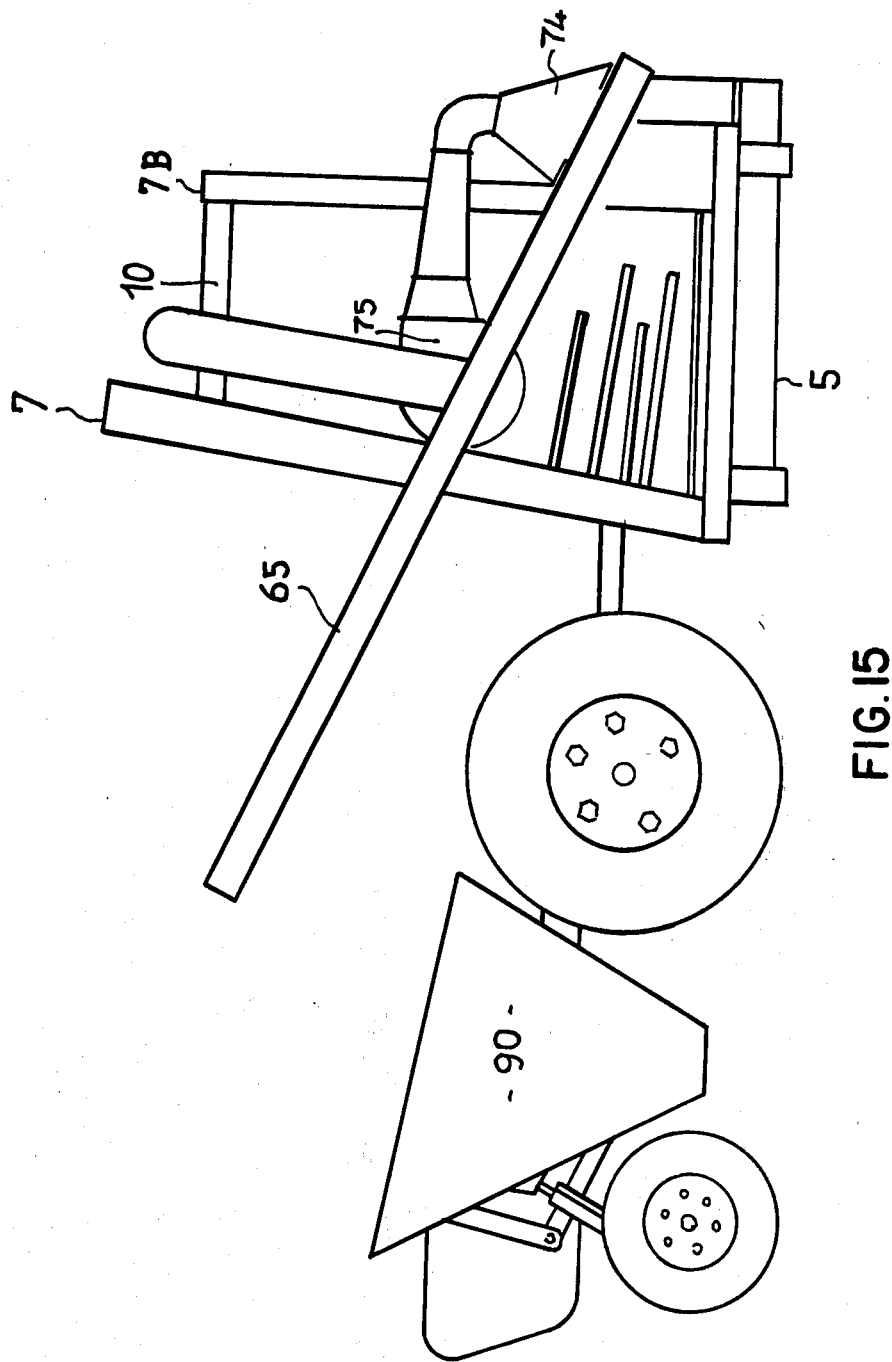
FIG. 15 is a side elevational view of the machine of the present invention with a tractor and bucket.

According to another embodiment of the invention, as illustrated in FIG. 15, the aspiration hood is arranged substantially horizontally at the level of and along conveyor 37. Here the aspiration opening is substantially vertical and the hood is at the level of and along the lower conveyor. The hood abuts the internal conveyor edge located opposite from the scales. The waste stoppage and evacuation member is a grilled rolling carpet 89 perpendicular to the conveyor which turns along a vertical plane about vertical rollers, of which at least one is activated by the machinery. The grilled carpet passes in front of the aspiration mount of hood 74 which is provided with supple lips or sealing drip flaps, as seen in FIG. 16. The current of purified and recycled air delivered by the nozzle sweeps the scales, licks the surface of the conveyor, and entrains leaves and wastes pressed against the carpet. This is achieved by aspiration to the rolling grilled carpet passing in front of the hood. After the grill leaves the aspiration zone, leaves and wastes are detached from the grill and fall to the floor. Lateral conveyor 90 has a transporter band arranged under the transverse conveyor and is mounted on a pivot integral with the chassis. The transverse conveyor ascends and can be oriented towards a laterally drawn basket or, in an alternate embodiment, to a bin 91 carried laterally on the tractor. Bin 91 is carried on the opposite side of the tunnel harvester with respect to the median axis of the coupling and advantageously balances the harvester. This bin is substantially trapezoidal and is arranged on the flank of a motor group between front and rear wheels. It is attached to a vehicle front and cooperates with a lifting element, e.g., a jack, which activates the bin as it rocks forwardly about its axis of rotation so that it can empty itself into a receiver which is placed at the end of a row of vines.

It is understood that the machine made accordance with the invention is particularly simple in design and advantageous in use because it can be easily pulled.

It is self-evident that the invention is not limited to the embodiments described but that it embraces all variations and modifications thereof.

I claim:

1. A grape picking machine for collecting a harvest comprising:
   (a) means for detaching said harvest from grapevine trunks;
   (b) at least two rows of partially overlapping, superimposed scales adapted to be positioned at the level of said trunks for recovering said harvest after detachment and for preventing said detached harvest from falling from said machine;
   (c) means for evacuating said harvest from said machine, said evacuating means including means for dividing said harvest into waste and must by aspirating said must such that it becomes entrained in air, means for recycling said air and entrained must through said machine and for conducting said air to an outlet, said outlet comprising means both for blowing air to prevent said harvest from falling between said scale rows and to propel said harvest along said scales;
   (d) a chassis carrying driving means for each of said detaching means, scales and evacuating means;
   (e) a portico laterally positioned upon said chassis and comprising a rearwardly inclined front element; and
   (f) beating means positioned on said front element.

2. A grape picking machine in accordance with claim 1 wherein said front element is inclined rearwardly with respect to the vertical axis of said chassis.

3. A grape picking machine in accordance with claim 1 wherein said detaching means comprise two groups of beaters, each group comprising inclined shafts mounted on moveable boards attached to said portico, and means for reciprocally activating said beater groups.

4. A grape picking machine in accordance with claim 3 wherein said activating means comprise a small bracket and a substantially triangular lever.

5. A grape picking machine in accordance with claim 3 wherein said activating means comprise a diagonal rod cooperating with a lever fixedly attacted to said portico to move said boards at the ends of said shafts.

6. A grape picking machine in accordance with claim 3 wherein said each of said groups comprise alternating long and short shaft.

7. A grape picking machine in accordance with claim 3 wherein said shafts are oriented towards the median axis of said portico.

8. A grape picking machine in accordance with claim 3 wherein said beaters of each group are alternately arranged on two planes to form a double beating plane for said harvest, said beating plane diagonally inclined with respect to a row of grapevines, whereby said shafts do not hit said grapevines simultaneously, but rather hit them alternately and progressively.

9. A grape picking machine in accordance with either of claims 3 or 8 wherein said shafts in one group are alternately angularly offset and height offset with respect to shafts in said other group.

10. A grape picking machine in accordance with claim 1 wherein said sealing means further comprises two overlapping rows of parallel scales superimposed in shingle-like fashion, each of said scales being substantially triangular and attached at a summit to a spar, spars positioned under each of said rows, said scales each having a terminal side and forming a plurality of saw-teeth for surrounding bases of said trunks.

11. A grape picking machine in accordance with claim 10 wherein each of said scales further has a short side substantially perpendicular to said portico and a large side connected to said short side by a convex side to form a front tooth and a rear point, whereby said convex side slides over a trunk as the machine is advanced over grapevines to assist in sealing about said trunks.

12. A grape picking machine in accordance with claim 10 wherein each of said rows is height and inclination adjustable and at least one of said rows is adapted to be vibrated to accelerate movement of said grape harvest towards a conveyor.

13. A grape picking machine in accordance with claim 12 wherein said at least one row has a vibratory motion imparted to it by a brace and a wearing plate.

14. A grape picking machine in accordance with claim 12 wherein said at least one row has a vibratory motion imparted to it by a joint linkage attached to one of said spars and one of said boards.

15. A grape picking machine in accordance with claim 1 and including an aspirator for both wastes and a portion of must carried by a conveyor, said wastes and must being derived from said detached harvest.

16. A grape picking machine in accordance with claim 15 whereby said air is purified and is blown by said outlet to the row of scales which is located farthest from said conveyor to propel said grape harvest toward said conveyor, to prevent said harvest from falling between said scales, and to recycle said must and air.

17. A grape picking machine in accordance with claim 16 wherein said outlet comprises a nozzle having two superimposed openings, one at the level of an upper row of said scales and one at the level of a lower row of said scales.

18. A grape picking machine in accordance with claim 17 further comprising a container adjacent said aspirator and nozzle, said container having internal baffles for stopping wastes and permitting air to pass.

19. A grape picking machine in accordance with claim 18 wherein said container comprises an endless screw for evacuating wastes.

20. A grape picking machine in accordance with claim 15 further comprising a moveable grill adjacent said aspirator, said grill preventing wastes from falling from the machine under gravity or due to the movement of a gill cleaning member.

21. A grape picking machine in accordance with claim 20 wherein said gill is circular and rotatably driven, said grill having a rotatable cleaning brush thereon.

22. A grape picking machine in accordance with claim 20 wherein said gill is substantially horizontal with respect to a hood of said aspirator and with respect to said conveyor.

23. A grape picking machine in accordance with claim 20 wherein said grill is off-centered with respect to a hood of said aspirator and with respect to said conveyor.

24. A grape picking machine in accordance with claim 20 wherein said grill is driven by a cleaning brush thereon.

25. A grape picking machine in accordance with any one of claims 20, 21, 22, or 23 wherein said rotatable grill is inserted between an upper and a lower flexible sealing lip, said lower lip having a lateral slit for evacuating leaves as said grill rotates.

26. A grape picking machine in accordance with claim 15 wherein said aspirator includes a hood arranged adjacent to said conveyor and a grilled vertical rolling carpet rotates in front of said hood.

27. A grape picking machine in accordance with claim 1 further comprising a tractor for towing said machine.

28. A grape picking machine in accordance with claim 1 comprising an upper row of scales and a lower row of scales separated by a gap, said means for blowing air comprising a nozzle having two openings, one positioned at the level of said upper row of said scales and one positioned at the gap between said two rows of scales.

29. A grape picking machine in accordance with claim 28 further comprising means for vibrating said scales.

30. A grape picking machine in accordance with claim 28 wherein said nozzle comprises a moveable shutter for adjusting the flow of air outwardly from said openings.

31. A grape picking machine in accordance with claim 1 wherein each of said scales has a polygonal configuration and wherein said scales are inclined with respect to a first conveyor.

32. A grape picking maching in accordance with claim 15 wherein said conveyor includes transverse grooves for retaining said must.

33. A grape picking machine in accordance with claim 27 wherein at least one rocking bin is carried by said tractor between its wheels and diagonally with respect to said portico for balance, whereby said bin receives said grape harvest.

34. A grape picking machine in accordance with claim 27 wherein a basket is provided for said harvest and is laterally drawn by said tractor.

35. A grape picking machine inn accordance with claim 27 further comprising a frame and wherein said evacuation means includes a first conveyor removably attached to said frame.

36. A grape picking machine in accordance with claim 35 wherein said evacuation means further comprises a second, upwardly angled conveyor adjacent to one end of said first conveyor.

37. A grape picking machine in accordance with claim 27 further comprising towing means attached to the points tractor.

* * * * *

UNITED STATES PATENT AND TRADEMARK OFFICE
CERTIFICATE OF CORRECTION

PATENT NO. : 4,282,705
DATED      : August 11, 1981
INVENTOR(S) : Andre FONTAN

It is certified that error appears in the above—identified patent and that said Letters Patent is hereby corrected as shown below:

Column 3, line 68, "raised at" should be --attached to--.
Column 10, line 6, "6" should be --5--.
Column 11, line 44 (claim 5), "attacted" should be --attached--.
Column 14, line 14 (claim 35), "inn" should be --in--.

Signed and Sealed this

Eighth Day of December 1981

[SEAL]

Attest:

GERALD J. MOSSINGHOFF

*Attesting Officer*      *Commissioner of Patents and Trademarks*